United States Patent [19]

Modavis

[11] Patent Number: 5,881,187
[45] Date of Patent: Mar. 9, 1999

[54] OPTICAL WAVEGUIDE FIBER BRAGG GRATING

[75] Inventor: Robert A. Modavis, Painted Post, N.Y.

[73] Assignee: Corning Incorporated, Corning, N.Y.

[21] Appl. No.: 973,835

[22] PCT Filed: Jul. 29, 1997

[86] PCT No.: PCT/US97/13342

§ 371 Date: May 1, 1998

§ 102(e) Date: May 1, 1998

[87] PCT Pub. No.: WO98/06001

PCT Pub. Date: Feb. 12, 1998

[51] Int. Cl.⁶ ...................................................... G02B 6/34
[52] U.S. Cl. ................................................. 385/37; 65/384
[58] Field of Search ................................. 385/14, 24, 28, 385/29, 46, 130, 131, 132; 65/384, 30.11, 111, 386, 392, 424, 425

[56] References Cited

U.S. PATENT DOCUMENTS

| 5,016,917 | 5/1991 | Dubner et al. | 283/4 |
| 5,341,444 | 8/1994 | Henry et al. | 385/11 |
| 5,478,371 | 12/1995 | Lemaire et al. | 65/384 |
| 5,499,154 | 3/1996 | Cullision | 361/18 |

Primary Examiner—Akm E. Ullah
Attorney, Agent, or Firm—William J. Chervenak

[57] ABSTRACT

A method for side writing Bragg gratings, having minimal birefringence, in a waveguide structure is disclosed. The method employs the orientation of the polarization direction of the writing light beam relative to the long axis of the waveguide structure together with the orientation of the intrinsic birefringence slow axis to effectively minimize birefringence in the subject grating.

6 Claims, 4 Drawing Sheets

OPTICAL WAVEGUIDE FIBER BRAGG GRATING

BACKGROUND OF THE INVENTION

The invention is directed to a method for forming a Bragg grating in an optical waveguide fiber. More particularly, the novel method includes steps which minimize birefringence in the grating.

The sensitivity of optical waveguide fibers to light of certain wavelength and intensity has been known since the late 1970's. It was found that the loss characteristic and refractive index of a waveguide fiber could be permanently changed by exposing the waveguide to light of a given wavelength and intensity. A publication which describes the effect and how it may be used is, "Light-sensitive optical fibers and planar waveguides", Kashyap et al., BT Techno., 1, Vol. 11, No. 2, Apr. 1993. The publication discusses the making of light-induced reflection gratings, page 150, section 2.1, and notes that the amount of refractive index change increases as light wavelength is reduced from 600 nm to 240 nm, where the photosensitivity of the waveguide appears to peak.

In "Bragg grating formation and germanosilicate fiber photosensitivity", SPIE V. 1516, Intn'l Workshop on Photoinduced Self-Organization Effects In Optical Fiber, Meltz et al., 1991, the mechanism and magnitude of photosensitivity is discussed (page 185, first paragraph, section 1.). This publication also discusses an interferometric technique of writing gratings (pp. 185–6, section 2.) At page 189, first paragraph, a measurement of induced birefringence is presented. See also FIG. 6 of that publication.

Another publication, "Characterization of UV-induced birefringence in photosensitive Ge-doped silica optical fibers", Erdogan et al., J. Opt. Soc. Am. B/V.11, No. 10, Oct 1994, notes the dependence of induced birefringence on the orientation of the polarization direction of the light incident upon the waveguide fiber. In particular, data presented in the publication shows that the induced birefringence is greatest when the polarization direction is oriented perpendicular to the long axis of the fiber and least when the polarization direction is parallel to the long axis of the fiber. See FIG. 3a. and FIG. 4. of the publication.

The Erdogan et al. publication points out that the induced birefringence polarization anisotropy can be used to make such devices, "as polarization mode converters and rocking filters", page 2100, first paragraph. However, in devices using resonant propagation, "the birefringence can result in substantial polarization dependence of resonant grating properties, such as reflectivity", page 2100, first paragraph.

The Erdogan, et al., data shows that even in the configuration where the polarization direction is along the long axis of the waveguide, some birefringence is still induced in the waveguide. Comparing the curves of FIG. 3a. and FIG. 4., the non-polarization dependent induced birefringence is a factor in the range of about 4 to 12 smaller than the polarization dependent induced birefringence. However, even this smaller amount of birefringence is undesirable. A more versatile and effective grating would result from a writing method which produces a grating having minimal birefringence.

DEFINITIONS

An optical waveguide grating is a periodic variation in refractive index of the waveguide along the long axis of the waveguide.

Photo-sensitivity is an interaction between certain glass compositions and selected light wavelengths wherein incident light changes the refractive index or the loss characteristics of the irradiated glass.

Side writing is a technique for forming a grating in an optical waveguide fiber wherein light is caused to form a periodic series of alternating light and dark fringes along the long axis of the waveguide. An example of such a periodic series is an interference pattern formed on the side of a waveguide fiber and along a portion of the long axis of a waveguide fiber. The periodic light intensity pattern, produced by the light interference, induces a periodic change in refractive index along a portion of the long axis of the waveguide fiber.

A phase mask may be a transmission diffraction grating, a component whose structure and characteristics are known in the art. In the context of this document a phase mask may also be a substrate having a series of periodically spaced openings. The phase mask may be used to side write a grating on a waveguide fiber wherein no optical components are positioned between the waveguide and the phase mask.

The symbols used to quantify the birefringence types described herein are:

$)n_{is}$, the difference in refractive index of the fast and slow axis caused by intrinsic birefringence;

$)n_{ps}$, the difference in refractive index of the fast and slow axis caused by polarization dependent birefringence; and $)n_{ts}$, the sum of the two index differences.

SUMMARY OF THE INVENTION

The novel method for writing a Bragg grating in a waveguide structure, as set forth in claim 1, meets the need for a method of writing a grating having minimal birefringence, thereby overcoming the deficiency in the prior art.

The method comprises the steps:

a) finding the orientation of the slow axis in the waveguide and the magnitude of the non-polarization dependent (intrinsic) induced birefringence, where the birefringence magnitude is described by $)n_{ts}$, the difference in refractive index between the fast and slow axis of the intrinsic birefringence;

b) finding the magnitude of the total, i.e., polarization dependent and intrinsic induced birefringence, $)n_{ps}$; and, c) writing a Bragg grating, using linearly polarized light, wherein the angle included between the polarization direction and the long axis of the waveguide structure is chosen such that the induced intrinsic birefringence together with the induced polarization dependent birefringence yields minimal birefringence. That is, the relative direction of the intrinsic slow axis compared to the polarization dependent slow axis is chosen such that the refractive index shows minimal anisotropy after the grating is written.

More particularly, the intrinsic slow axis is found by directing light onto the waveguide structure. The light may be randomly polarized, circularly polarized, or linearly polarized, provided, in the latter case, the polarization direction is oriented parallel to the waveguide structure long axis. The magnitude and orientation of the intrinsic induced birefringence is found by conventional means such as those described in the Meltz et al. or Erdogan et al. publications cited above.

The total induced birefringence is found by illuminating the waveguide structure with linearly polarized light having its polarization direction oriented perpendicular to the waveguide structure long axis and parallel to the intrinsic slow axis direction found initially. This orientation is selected because, as noted in Erdogan et al., this orientation of the polarization yields a maximum polarization dependent birefringence and forms the polarization dependent slow axis along the intrinsic slow axis. Stated differently, the polarized light increases refractive index along the direction of polarization by an amount greater than it does in a direction perpendicular to both the long axis and the polarization direction. Thus, the slow axis of the polarization dependent birefringence will be parallel to the polarization direction. By aligning the intrinsic slow axis with the polarization direction, a sum of intrinsic and polarization dependent birefringence is induced in the waveguide structure. Then $)n_{ps}$ can be found by taking the difference, $)n_{ts}-)n_{is}$.

In the final step, a Bragg grating is written along a segment of the waveguide structure long axis. The orientation of the linear polarization of the writing light, relative to the slow axis of the intrinsic birefringence, is chosen to minimize birefringence. That is, the writing geometry is chosen such that intrinsic induced birefringence and the polarization induced birefringence serve to substantially cancel one another. The waveguide segment upon which the grating is written is located near the segments used to determine the intrinsic and polarization dependent birefringence properties. Given the high purity and uniformity of waveguide structures, it is reasonable to assume that the glass properties do not change significantly over the waveguide length required to carry out the three step method.

The details of how one orients the polarization direction of the writing beam relative to the intrinsic slow axis of the optical waveguide are given below in conjunction with the discussion of FIG. 3b. The waveguide structure may have many specific forms including that of a waveguide fiber or a planar waveguide, wherein any of these are made by any of the methods known in the art.

Any of numerous side illumination techniques may be used to write the Bragg grating in the waveguide structure. These include interferometric methods which employ a phase mask, a transmission grating, or a beam splitter. Other side writing methods may use only a phase mask or point illumination along the waveguide structure.

In addition, the light source for carrying out the method may be any of several types, including lasers, or incandescent, vapor type, or fluorescent lamps. The wavelength range of the source is about 100 nm to 600 nm and the coherence length is in the range of 10 :m to several meters.

The grating may be written in a number of waveguide structures including, optical waveguide fiber, a planar optical waveguide, or a planar optical waveguide component such as a coupler or multiplexer.

DETAILED DESCRIPTION OF THE INVENTION

The novel method of forming a minimal birefringence Bragg grating in a waveguide structure relates to the control of two distinct types of glass photosensitivity. A first interaction type results from the interaction of essentially unpolarized light or circularly polarized light or linearly polarized light, having the polarization direction along the long axis of the waveguide, with particular glass compositions. The interaction produces a birefringence in the glasses which is called intrinsic birefringence. Intrinsic birefringence is distinguished from polarization dependent birefringence, wherein the glass is sensitive to the polarization direction of incident light.

By controlling the polarization direction of a birefringence inducing light beam, the intrinsic and polarization dependent birefringence can be made to act together to minimize the birefringence of a Bragg grating. Such gratings are effective, for example, as narrow band filters, as resonating laser structures, as dispersion compensators, or for wavelength division multiplexers.

Figure 1A:
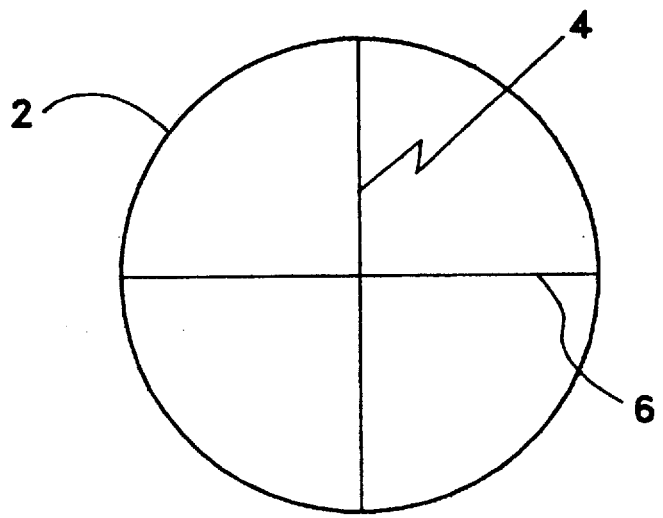
FIG. 1a is an end view of a waveguide structure showing the orientation of the fast and slow axis of a birefringence.

FIG. 1a is an end view of a waveguide structure 2 showing the mutually perpendicular birefringence axes 4 and 6. Light having a polarization direction aligned along one axis, propagates at a higher speed in comparison to light having its polarization aligned the other axis. The former may be called the fast axis and the latter the slow axis.

Figure 1B:
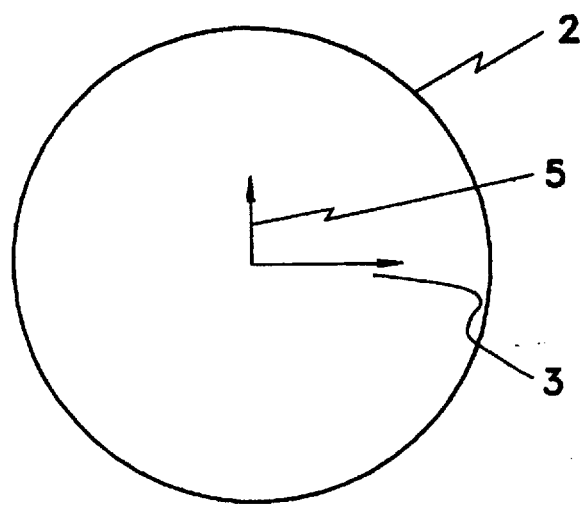
FIG. 1b is an end view of a waveguide structure showing the relative refractive index corresponding to the fast and slow axis of birefringence.

The relative refractive index along the fast axis compared to the slow axis is illustrated in FIG. 1b. The lower refractive index shown as arrow 5 is the fast axis and the higher refractive index shown as arrow 3 is the slow axis.

Figure 2:
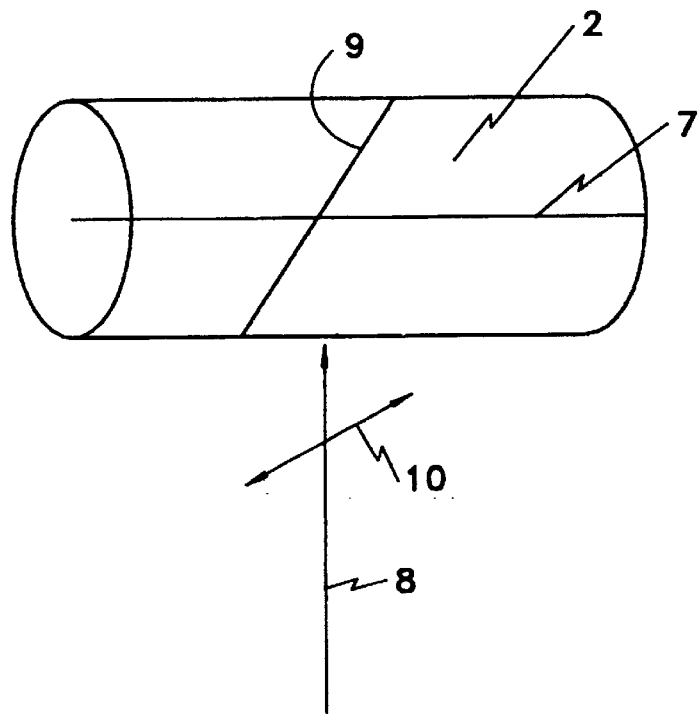
FIG. 2 is a side view of a waveguide structure showing the long axis of the waveguide, a birefringent axis in the waveguide and an incident polarized light beam.

An experimental configuration for determining total birefringence is illustrated in FIG. 2. The waveguide structure 2 is shown in side view. Light beam 8 having a polarization direction 10 is incident on waveguide structure 2. The light beam 8 is substantially perpendicular to the long axis 7 of the waveguide structure 2. The slow axis 9 of the intrinsic birefringence is oriented to lie along polarization direction 10. It is known that orienting polarization direction 10 perpendicular to long axis 7 yields a maximum polarization dependent induced birefringence and that the slow axis thereof lies along the polarization direction 10 as noted above. Thus, a maximum total birefringence is induced in the configuration wherein intrinsic slow axis 9, which is perpendicular to axis 7, is aligned with polarization direction 10.

Figure 3A:
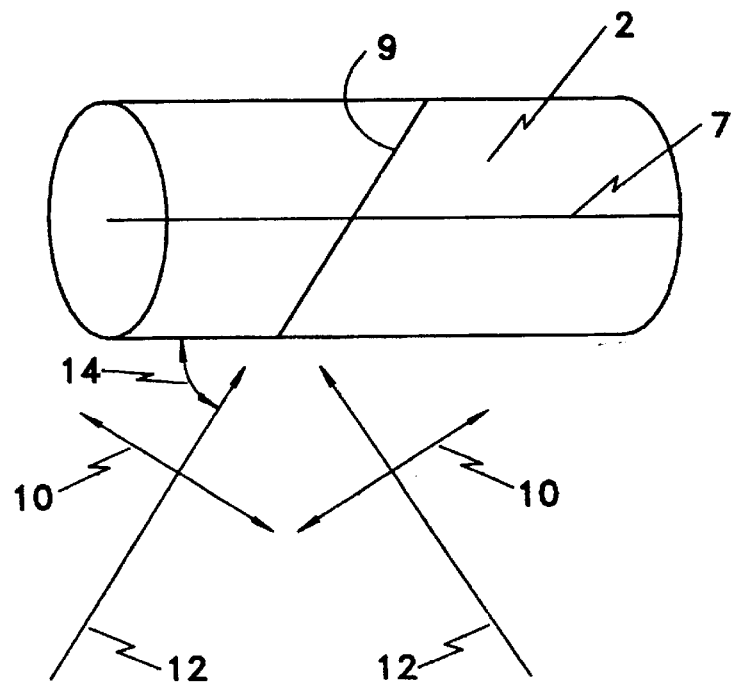
FIG. 3a is a side view of a waveguide structure showing the long axis of the waveguide, a birefringent axis in the waveguide and incident, overlapping light beams.

Given the orientation of the intrinsic slow axis and the magnitude of both the intrinsic and the polarization dependent birefringence, expressed as the refractive index differences between fast and slow axes, one may now write a grating having minimum birefringence Referring to FIG. 3a, a general description of the grating writing method may be given. Coherent beams 12 are incident on waveguide structure 2 and interfere there to produce light and dark fringes on structure 2. The intrinsic slow axis 9 is oriented relative to polarization direction 10 to produce a minimum birefringence in the waveguide after the grating is written.

Figure 3B:
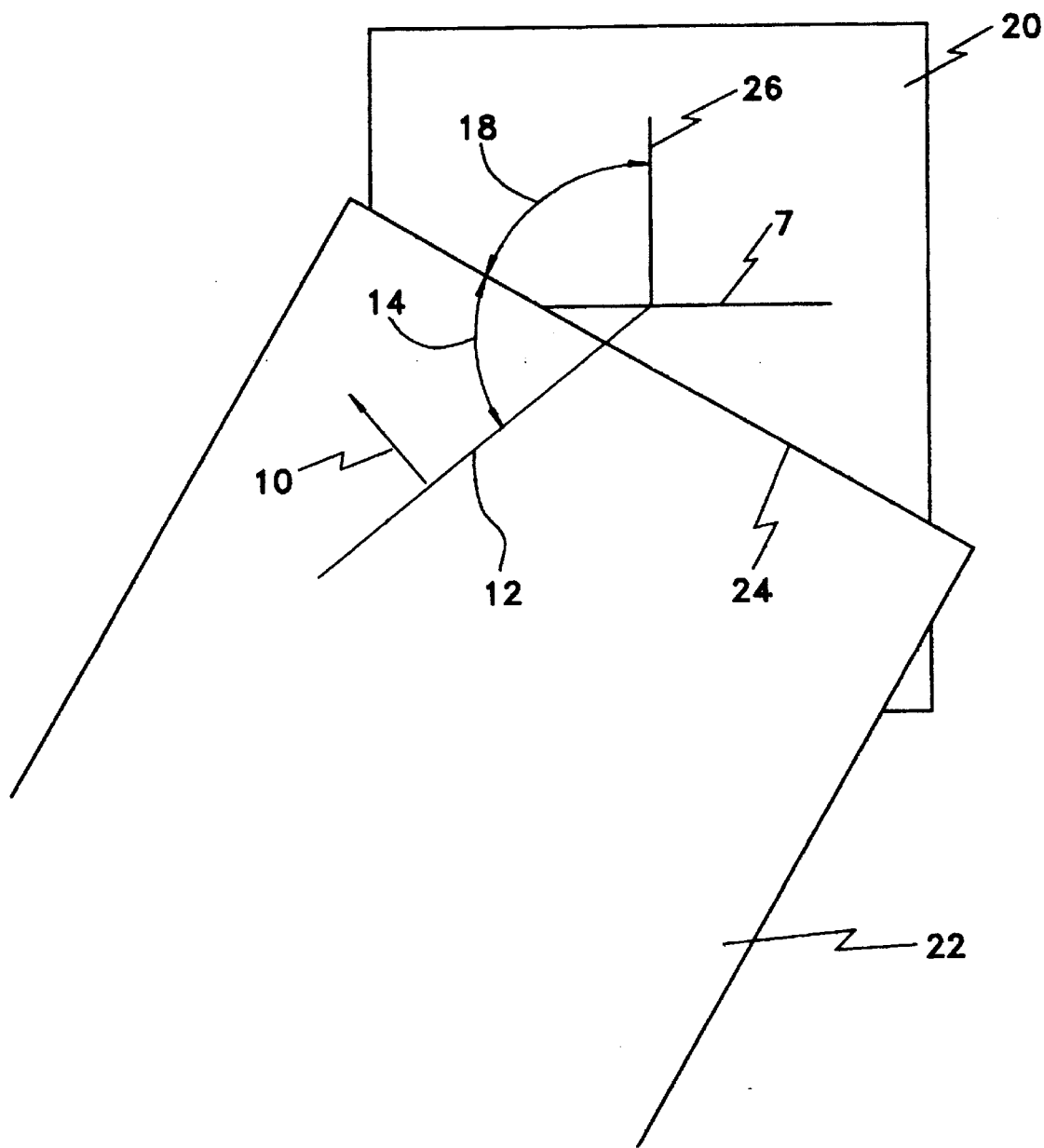
FIG. 3b is a schematic view of FIG. 3a for use in relating the polarization direction to the orientation of the intrinsic slow axis.

The details of how polarization 10 and intrinsic slow axis 9 are to be oriented are now discussed with reference to FIG. 3b.

The plane 22 is defined by light beam 12 and its polarization 10. Note that 12 and 10 are perpendicular. The plane 20 is defined by the waveguide centerline 7 and the vertical 26 which is perpendicular to 7. Planes 20 and 22 intersect to form line 24. Beam 12 and intersection 24 form an included angle 14. Thus the projection of polarization 10 onto line 24 is (10) sin 14, where (10) denotes the magnitude of the polarization vector. The intersection 24 and vertical 26 form an included angle 18. Thus the projection of (10) onto waveguide axis 7 is (10) sin 14 sin 18. The magnitude of (10) which is perpendicular to waveguide axis 7 is, by difference, $(10)(1-\sin^2 14 \sin^2 18)^{1/2}$. The direction of this perpendicular component, expressed as the included angle it forms with vertical 26, is angle 30, shown in FIG. 4. Note that angle 30 is $\cos^{-1}\{\sin 14 \cos 18/(1-\sin^2 14 \sin^2 18)^{1/2}\}$.

Figure 4:
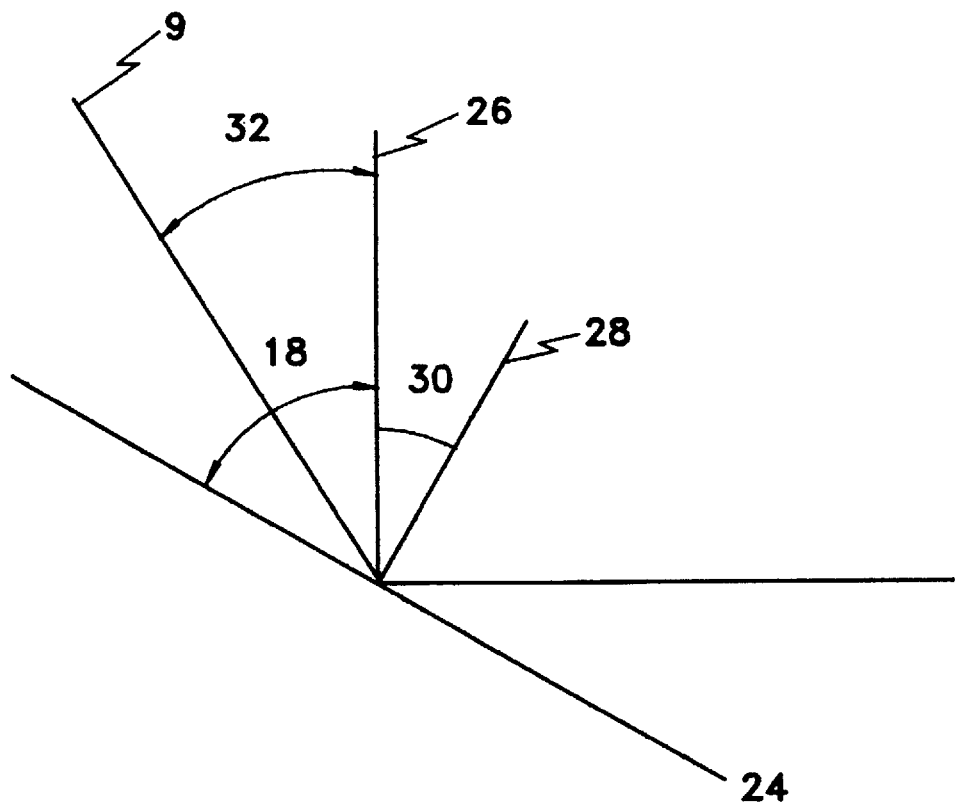
FIG. 4 is an end view of a waveguide structure showing the angle between the intrinsic slow axis and a polarization dependent slow axis.

The minimum birefringence grating is then written by choosing angle 32 in FIG. 4, the angle included between the intrinsic slow axis 9 and vertical 26, such that the sum of angles 30 and 32 is 90°, and, by adjusting angles 14 and 18 to bring $)n_{ps}$ as close as possible to $)n_{is}$. If $)n_{is} \geq )n_{psmin}$, where $)n_{psmin}$ is achieved when angle 18 is 90° and angle 14 is as close to 90° as possible in accordance with the Bragg condition and the wavelength of the writing beam, then angle 18 may be chosen to yield the optimum low birefringence condition $)n_{is}=)n_{ps}$. That is, when the two types of birefringence may be impressed on the waveguide structure to produce equal birefringence axes which are mutually perpendicular, a grating of minimum birefringence is written. The polarization dependent birefringence writes a slow axis which complements the intrinsic birefringence slow axis and so provides minimal birefringence in the grating.

An alternative writing method may be used when $)n_{is}$ is small compared to the minimum value of $)n_{ps}$. Although cumbersome and difficult to control, a grating may be written one fringe at a time. In this case, an interference technique is not used so that the angles 14 and 18 may be chosen such that $)n_{is}=)n_{ps}$ at every point along the grating.

EXAMPLE-WRITING A BIREFRINGENCE FREE BRAGG GRATING IN A WAVEGUIDE FIBER

Intrinsic Birefringence

The magnitude and slow axis direction of the intrinsic birefringence is found as follows. A germanium doped step index waveguide fiber is illuminated from the side using a linearly polarized excimer laser. The laser operates at a wavelength near 248 nm. A short section of the waveguide fiber, about 0.5 cm; receive an energy flux of about 200 mJ/cm$^2$ per laser pulse. The laser operates at a rate of about 10 Hz and the waveguide is illuminated for a time in the range of 1–10 minutes.

The laser beam direction forms a right angle with the long axis of the fiber, the beam having a polarization parallel to the long axis of the fiber, so that essentially no polarization dependent birefringence is induced.

The induced birefringence is called intrinsic because the birefringence depends upon the properties of the waveguide glass rather than the polarization direction of the incident light beam.

The intrinsic birefringence is measured by finding the orientation of the slow axis and by finding $)n_{is}$, the refractive index difference between the fast and slow axes. Conventional measurement means known in the art are used.

Total Birefringence

The total birefringence is induced in a short section of the waveguide fiber, located near the section used in the first step, by orienting and operating the excimer laser as before except that the polarization direction of the incident light is disposed perpendicular to the long axis of the waveguide fiber. To insure that the maximum birefringence is induced, i.e., both intrinsic and polarization dependent, the intrinsic slow axis is aligned parallel to the polarization direction. The assumption is made that the direction of the intrinsic slow axis will not change appreciably for short distances, of the order of several tens of centimeters, along the waveguide fiber. The excellent composition and geometry control possible in the manufacture of optical waveguide fibers and other waveguide structures lends credence to the validity of the assumption.

The total induced birefringence is measured as before. By experiment design, the slow axis orientation lies along the polarization direction of the fiber. The magnitude of the birefringence is $)n_{ts} =)_{is} +)nis$.

Writing the Bragg Grating

The excimer laser is now used, in a side illumination technique, on a section of waveguide fiber near the sections used above, to write a grating. A preferred method includes a phase mask or transmission grating, illuminated by an excimer laser, as the light source for an interferometer. The angle of incidence of the interfering light beams, 14 in FIG. 3a is noted. Then the condition wherein $)n_{is}$ is most nearly equal to $)n_{ps}$ is achieved by adjusting angles 18 and 14 as described above.

The resulting grating has minimum birefringence.

Although particular embodiments of the invention have herein been disclosed, illustrated, and described, the invention is nonetheless limited only by the following claims.

I claim:

1. A method for forming a Bragg grating, having minimum birefringence, in an optical waveguide structure comprising the steps:

providing a waveguide structure, having a length and a long axis, comprising photosensitive glass in which both intrinsic and polarization dependent birefringence may be photo-induced;

photo-inducing intrinsic birefringence in a first length portion of the waveguide structure;

measuring the intrinsic birefringence slow axis orientation and magnitude of said first length portion;

photo-inducing intrinsic and polarization dependent birefringence in a second length portion of the waveguide structure, located near the first waveguide length portion, using light having a polarization direction, wherein the polarization direction is perpendicular to the long axis of the waveguide structure and parallel to the intrinsic birefringence slow axis;

measuring the magnitude of the combined intrinsic and polarization induced birefringence, the magnitude of the polarization induced birefringence, being equal to the difference between the total and intrinsic birefringence magnitudes; and, photo-inducing a Bragg grating in a third length portion of the waveguide structure located near said first and second length portions, using a side illumination technique, the side illumination having a polarization direction, wherein the polarization direction is oriented at an angle relative to the waveguide long axis to induce a polarization dependent birefringence having a slow axis perpendicular to the long axis of the waveguide fiber, and wherein the illumination also induces an intrinsic birefringence, the intrinsic slow axis being oriented at 90° relative to the polarization dependent birefringence slow axis.

2. The method of claim 1 wherein the intrinsic birefringence is induced using a linearly polarized light source, the polarization direction oriented parallel to the long axis of the waveguide structure.

3. The method of claim 1 wherein the intrinsic birefringence is induced using a randomly polarized or circularly polarized light source.

4. The method of claim 1 wherein the photo-inducing light is provided by an excimer laser operating in a wavelength range of about 100 nm to 600 nm.

5. The method of claim 1 wherein the side illumination technique is selected from the group consisting of interferometry using a phase mask, interferometry using a transmission grating, interferometry using a beam splitter, direct application of a phase mask, and use of point illumination along the waveguide.

6. The method of claim 1 wherein the waveguide structure is selected from the group consisting of an optical waveguide fiber, a planar optical waveguide, a planar optical coupler, and a planar multiplexer.

* * * * *